(12) United States Patent
Hartman et al.

(10) Patent No.: US 7,089,534 B2
(45) Date of Patent: Aug. 8, 2006

(54) MODEL BASED TEST GENERATION FOR VALIDATION OF PARALLEL AND CONCURRENT SOFTWARE

(75) Inventors: Alan Hartman, Haifa (IL); Andrei Kirshin, Haifa (IL); Kenneth Nagin, D.N. Nazareth Ilit (IL); Sergey Olvovsky, Haifa (IL); Aviad Zlotnick, D.N. Galil Takhton (IL)

(73) Assignee: International Business Machines Corporation, Armonk, NY (US)

( * ) Notice: Subject to any disclaimer, the term of this patent is extended or adjusted under 35 U.S.C. 154(b) by 817 days.

(21) Appl. No.: 10/135,409

(22) Filed: May 1, 2002

(65) Prior Publication Data

US 2003/0208351 A1    Nov. 6, 2003

(51) Int. Cl.
    *G06F 9/44* (2006.01)
(52) U.S. Cl. .................. 717/125; 717/128; 717/126
(58) Field of Classification Search ............... 717/125, 717/128, 131; 714/15, 16, 17, 18, 19, 20, 714/21, 22, 23, 24, 37, 38, 39; 706/21; 702/119, 702/123; 703/23, 24, 25, 26, 27
    See application file for complete search history.

(56) References Cited

U.S. PATENT DOCUMENTS

| | | | | |
|---|---|---|---|---|
| 5,394,347 A | * | 2/1995 | Kita et al. ...................... 703/2 |
| 5,708,774 A | * | 1/1998 | Boden .......................... 714/38 |
| 5,751,941 A | * | 5/1998 | Hinds et al. ................... 714/38 |
| 5,815,654 A | * | 9/1998 | Bieda ........................... 714/38 |
| 5,913,023 A | * | 6/1999 | Szermer ....................... 714/38 |
| 5,918,037 A | * | 6/1999 | Tremblay et al. .............. 716/2 |
| 5,974,256 A | * | 10/1999 | Matthews et al. ........... 717/141 |
| 5,991,537 A | * | 11/1999 | McKeon et al. ............. 717/115 |
| 6,161,219 A | * | 12/2000 | Ramkumar et al. ......... 717/130 |
| 6,212,672 B1 | * | 4/2001 | Keller et al. ................. 717/104 |
| 6,453,308 B1 | * | 9/2002 | Zhao et al. ..................... 706/21 |
| 6,601,018 B1 | * | 7/2003 | Logan .......................... 702/186 |
| 6,662,236 B1 | * | 12/2003 | Apte et al. ................... 719/320 |
| 6,662,312 B1 | * | 12/2003 | Keller et al. ................... 714/38 |
| 6,701,514 B1 | * | 3/2004 | Haswell et al. ............. 717/115 |
| 6,748,585 B1 | * | 6/2004 | Proebsting et al. ......... 717/136 |
| 6,766,481 B1 | * | 7/2004 | Estep et al. ................. 717/124 |
| 6,772,821 B1 | * | 8/2004 | Fulton et al. ............. 164/150.1 |

(Continued)

OTHER PUBLICATIONS

"Improving the Maintainability of Automated Test Suites", Cem Kaner, Quality Week, 1998, pp. 1-17.*

(Continued)

*Primary Examiner*—Todd Ingberg
(74) *Attorney, Agent, or Firm*—Browdy and Neimark, PLLC

(57) ABSTRACT

An execution engine synchronizes test suite execution to run multiple independent operations concurrently or in parallel. The execution engine operates by stepping through the test suite. At each step it runs the required number of independent operations and waits for their completion. It then checks the results, and continues to the next step of the test suite. If at any step, the actual results are different from the expected results, then the exact sequence that triggered the fault is known. The sequence can be repeated when a correction is provided for the fault. Furthermore, the execution engine allows the user to interactively step through a test case when debugging a fault. A synchronization pattern generator may be incorporated in the system to generate minimal numbers of repetitions of test cases to guarantee varying degrees of interaction coverage.

88 Claims, 10 Drawing Sheets

U.S. PATENT DOCUMENTS

| | | | |
|---|---|---|---|
| 6,792,595 B1 * | 9/2004 | Storistenau et al. | 717/110 |
| 6,802,059 B1 * | 10/2004 | Lyapustina et al. | 717/143 |
| 6,804,634 B1 * | 10/2004 | Holzmann et al. | 703/2 |
| 6,810,364 B1 * | 10/2004 | Conan et al. | 702/188 |
| 6,817,009 B1 * | 11/2004 | Flanagan et al. | 717/126 |
| 6,823,445 B1 * | 11/2004 | May et al. | 712/226 |
| 6,826,752 B1 * | 11/2004 | Thornley et al. | 718/100 |

OTHER PUBLICATIONS

"Dictionary of Object Technology", Donald G. Firesmith et al, Sep. 22, 1995, pp. 56-91, 115, 189-211, 322-328.*

"Generating Test Cases from UML Specifications", Aynur Abdurazik, May 1999, pp. 1-103.*

Test Environment Toolkit TETware User Guide Revision 1.2 TET3-UG-1.2, The Open Group, Sep. 18, 1998, pp. 1-116.*

Test Environment Toolkit TETware Programmers Guide Revision 1.2 TET3-PG-1.2, The Open Group, Sep. 18, 1998, pp. 1-116.*

Using the WFT Development Environment, Template Software, 1998, Whole Manual.*

"Automated Computer Performance Model Calibration Method Using Rule Based Interfacing and Generate-And-Test Paradigm", IBM Technical Bulletin, May 1, 1990, 2 pages.*

The Telelogic Tau TTCN Suite, Produced by Telelogic AB, Sweden. (Available at: http://www.telelogic.com/products/tau), 2002, 2 page.

The GOTCHA-TCBeans Software Test Tool Kit, Developed by International Business Machines Corporation, NY. (Available at: http://www.haifa.il.ibm.com/progects/verification/gtcb/), 2002, 2 page.

LoadRunner®, available from Mercury Interactive, Inc. 2002. (Available at: htttp://www-heva.mercuryinteractive.com/products/loadrunner), 2 page.

* cited by examiner

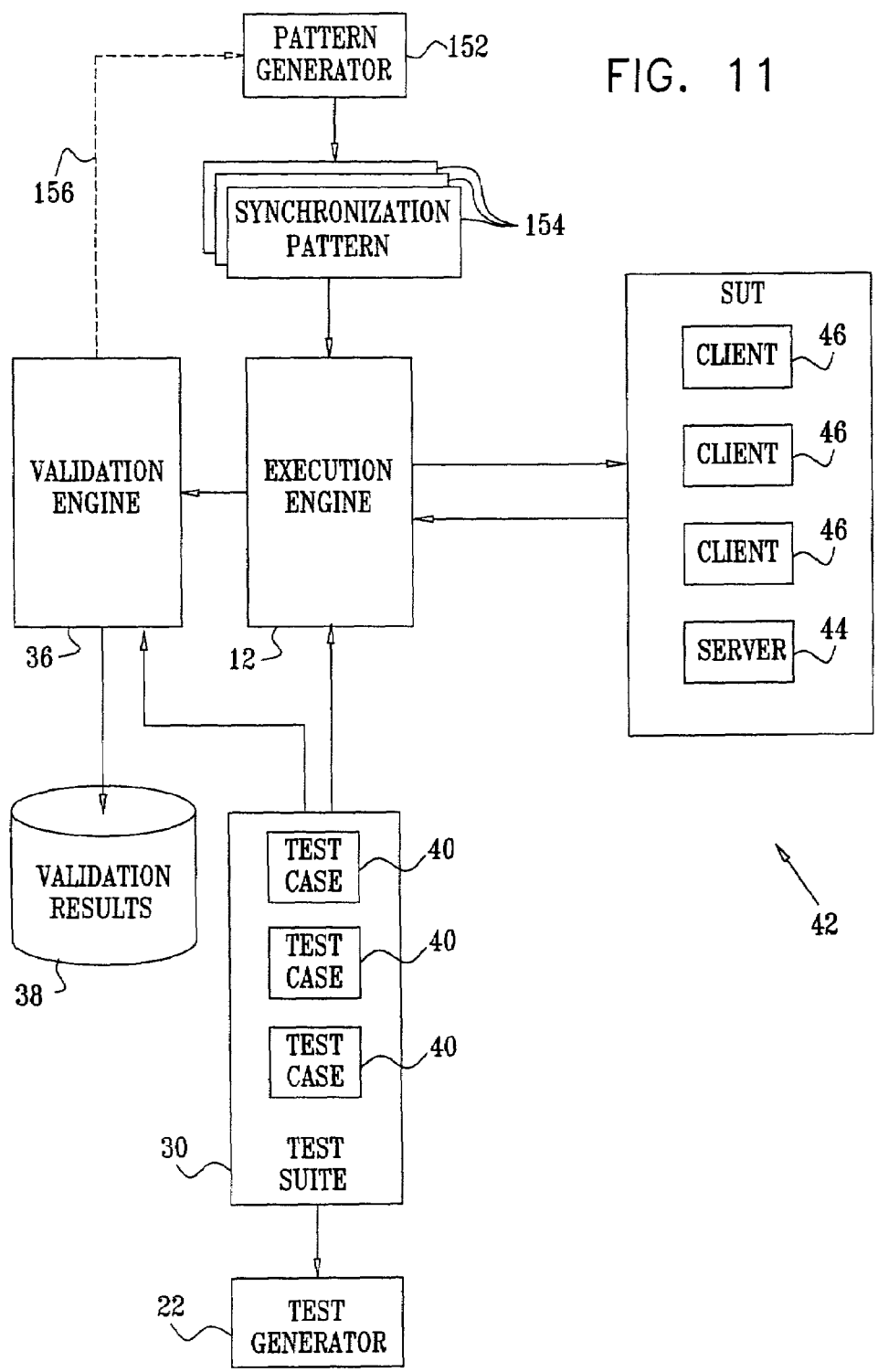

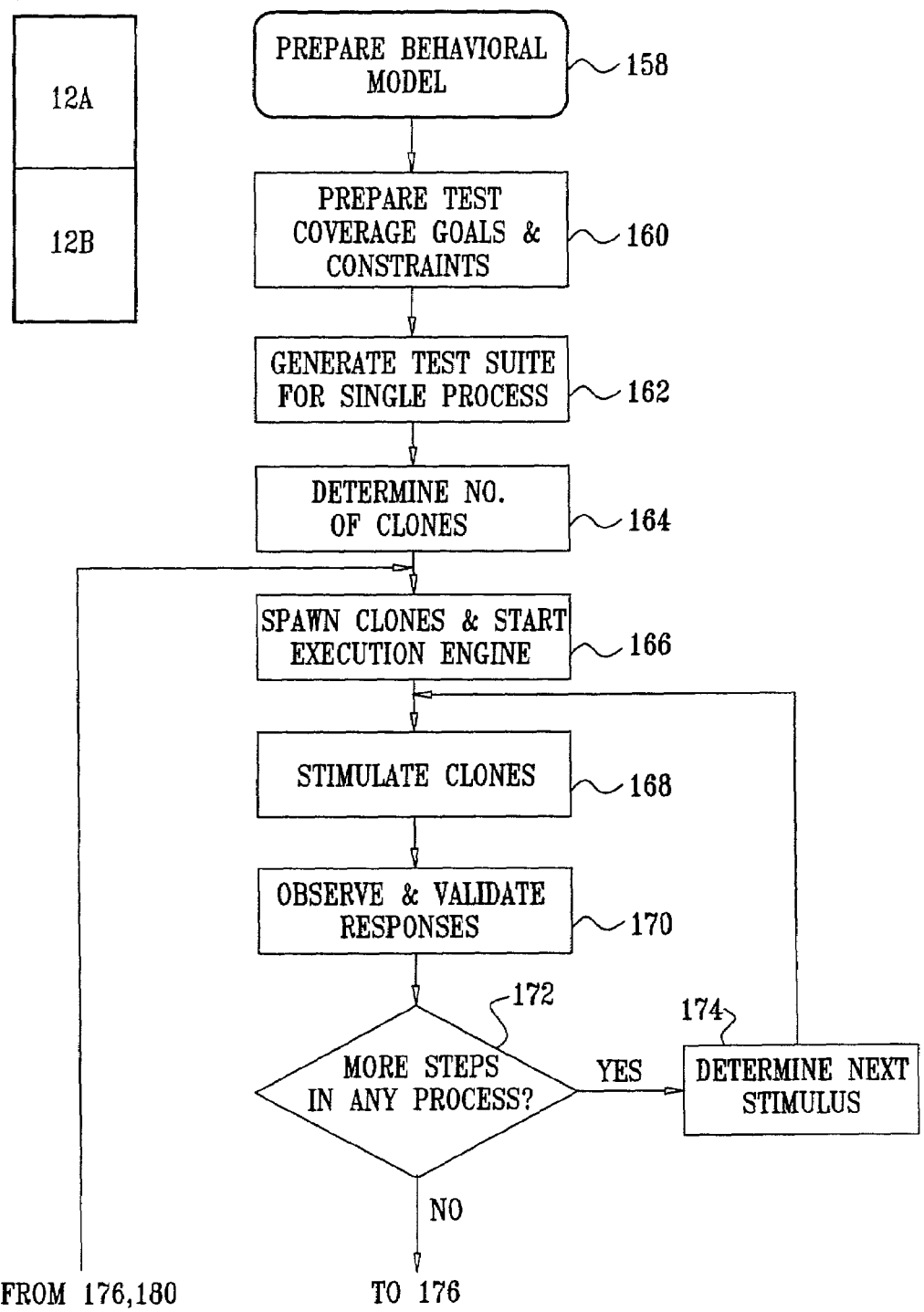

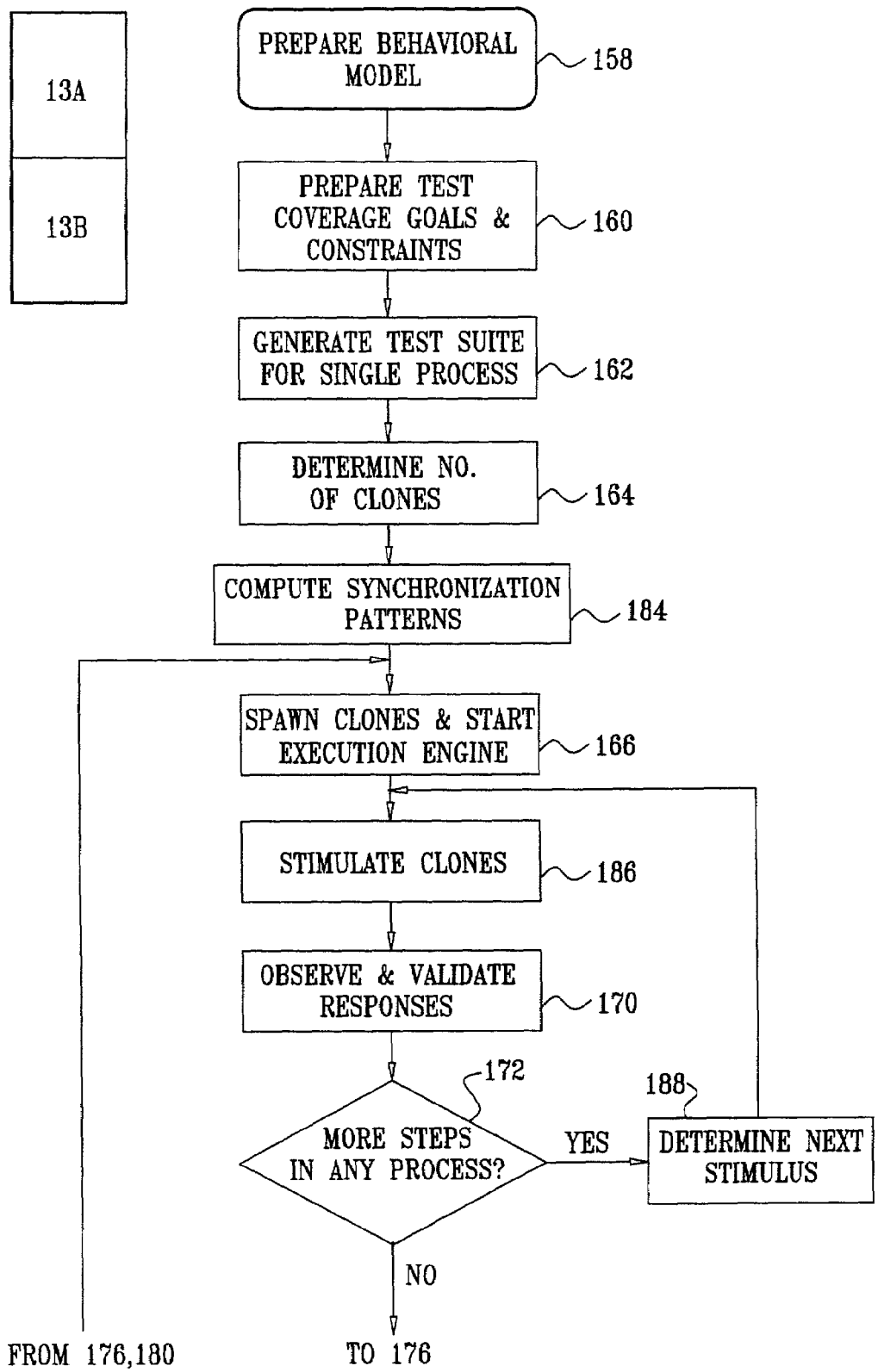

MODEL BASED TEST GENERATION FOR VALIDATION OF PARALLEL AND CONCURRENT SOFTWARE

BACKGROUND OF THE INVENTION

1. Field of the Invention

This invention relates to software verification. More particularly, this invention relates to test program generation for validating the implementation of a specification of a software program that is capable of executing multiple independent operations.

2. Description of the Related Art

Concurrent and parallel software supports operations involving interdependent interactions between its classes and objects. Such operations may occur concurrently or in parallel. Concurrent operations occur in the same address space, but run in separate threads. Parallel operations occur in separate address spaces. Since the operations occur in separate address spaces, their associated objects may be distributed across multiple hosts.

An important aspect of designing an advanced computer software system is the ability to thoroughly test its implementation in order to assure that the implementation complies with desired specifications. Usually, such verification requires the generation of test programs to verify that the system behaves properly under a wide variety of circumstances.

Traditional software testing involves study of the software system by the tester, who then writes and executes individual test scenarios that exercise the software being tested. Testing may require validation of many functional levels, which substantially increases the complexity of the task. In the past, test scenarios were manually generated, but now this task is sometimes automated, using computer implemented test program generators.

Test program generators are basically sophisticated software engines, which are used to create numerous test cases. By appropriate configuration, it is possible for test program generation either to be focused on very specific ranges of conditions, or to be broadened to cover a wide range 90 of logic. Today, large numbers of test cases can be created in the time that a single test case could be written manually.

During the past decade, model-based random test program generators have become popular in processor architectural design verification and software testing. Model-based test generation involves the generation of a suite of tests from an abstract model of an application's behavior. The model is derived from a specification of the application. In many model-based testing situations, the behavior models are described as finite state machines (FSM). Such FSM models describe the possible states of the application and the transitions from state to state caused by operations or stimuli. Test suites generated from these behavior models cover different operation invocation patterns according to the testing goals.

Typical of conventional approaches for generating test programs is U.S. Pat. No. 5,394,347 to Kita et al., which discloses a method of modeling a specification as an extended finite state machine, then performing a depth-first traversal of the resulting state diagram to generate a path file as a basis for a test program.

In U.S. Pat. No. 5,918,037 to Tremblay et al., it is proposed to employ a test generator that automatically produces test programs based on a finite state machine model of the software. Limiting the number of test programs is achieved by controlling loop execution, and by appropriately setting the coverage level for the model, known as "transition cover testing". This approach seeks to specify that each transition within the finite state machine model be exercised once. The generator is capable of specifying different coverage levels for selected portions of the program under test, so that critical portions might be exhaustively tested, while other portions receive less comprehensive testing.

Test programs are repetitively executed by an execution engine, using suites of input data. The results of execution are compared in some way with design specification. Generic validation engines are known for this purpose. The validation engine need not have specific knowledge of the design, and can be used in the testing of many system components. Some validation engines maintain state tables for tracking outcomes, such as a sequence of events. Such an engine typically implements a predetermined algorithm for validating the outcome or sequence of events.

The standard TTCN (ISO/IEC-9646) is a notation standardized by the International Organization for Standardization (ISO) and the Telecommunication Standardization Sector of the International Telecommunications Union (ITU-T) for the specification of tests for communicating systems. The standard TTCN has been employed in many test generation and execution environments. A TTCN-based model-based tool for the generation of test suites suitable for complex systems, known as the Telelogic Tau TTCN Suite, is produced by Telelogic AB, PO Box 4128, Kungsgatan 6, SE-203 12 Malmy, Sweden. This is an example of a commercial test execution engine, the input of which is an abstract TTCN test suite. The standard TTCN provides concurrency and synchronization primitives. However, a tester interested in validating concurrent aspects of a system-under-test is required to write specialized test cases.

Another model-based generator is the GOTCHA-TC-Beans Software Test Tool Kit, which has been developed by International Business Machines Corporation, New Orchard Road, Armonk, N.Y. 10504. This tool provides a framework designed to assist testers in developing, executing and organizing function tests directed against Application Program Interfaces (APIS) and software protocols written in Java™, C or C++.

The product LoadRunner®, available from Mercury Interactive, Inc. 1325 Borregas Avenue 220, Sunnyvale, Calif. 94089, USA, emulates multiple users, called virtual users. The virtual users execute Vuser scripts, written in a proprietary testing language. The tester creates a Vuser script, parameterizes the script, and then configures the LoadRunner software to start the virtual user execution. If the tester wants to synchronize activity between the different virtual users he must add synchronization points to the scripts, known as rendezvous.

Known test program generators are limited in their abilities to deal with systems having concurrent and parallel operations, for example multiprocessors and complex software suites such as client/server applications, database and transaction processing systems. The traditional approach to validating independent operations is either to model the independent behavior of the multiple operations or processes, or to run test cases in parallel.

Modeling independent behavior is not a good solution, because it results in excessively large and intractable models. One of the biggest drawbacks of finite state machine modeling is state explosion. Modeling independent events exacerbates this problem. Running test cases concurrently or in parallel is even less effective, because it results in a lack of control and clarity. There may be many concurrent operations in a test case, and the location of a fault trigger that is uncovered by this technique is often obscure. Lack of control over the concurrent operations further complicates interactive fault debugging.

In view of the above-noted drawbacks of conventional approaches, it would be desirable to improve the methods and techniques for the validation of concurrent and parallel systems.

SUMMARY OF THE INVENTION

It is a primary advantage of some aspects of the present invention that a software system, which is capable of multiple independent concurrent operations, can be modeled and its implementation tested using a finite state machine having a small number of states.

It is another advantage of some aspects of the present invention that faults can be conveniently located when testing a system implementation, in which the system is capable of multiple independent concurrent operations.

It is a further advantage of some aspects of the present invention that faults can be interactively debugged during validation of a software system, in which the system is capable of multiple independent concurrent operations.

These and other advantages of the present invention are attained by an arrangement for validating concurrent and parallel systems by exploiting model based test generation. In a preferred embodiment of the invention, an execution engine executes test programs by stepping through the test suite. At each step it runs the required number of independent operations and waits for their completion. It then checks the results, and continues to the next step of the test suite. If the actual results at any step are different from the expected results, then the exact sequence that triggered the fault is known. The sequence can be repeated when a correction is provided for the fault. Furthermore, the execution engine allows the user to interactively step through a test case when debugging a fault.

The invention provides an apparatus for verification of a system implementation, including a generator for generating a test program for execution thereof on a system-under-test, and a synchronizer that organizes a plurality of test cases of the test program into discrete synchronization steps. An execution engine is responsive to the synchronizer for stimulating the system-under-test according to the test program, to cause the system-under-test to concurrently execute the test cases synchronously in the synchronization steps. The apparatus further includes a validation engine for comparing a response of the system-under-test with a predicted result upon completion of one of the synchronization steps.

According to an aspect of the apparatus, a behavioral simulator for the system-under-test is constructed by the generator using a behavioral model of the system-under-test.

According to another aspect of the apparatus, the test cases are executed in a first cloned object and a second cloned object.

According to a further aspect of the apparatus, the test cases comprise a plurality of different test cases that execute on a plurality of cloned objects.

According to an additional aspect of the apparatus, the test cases comprise a plurality of different test cases that execute on a plurality of different objects.

According to one aspect of the apparatus, the test cases comprise a plurality of cloned processes.

According to another aspect of the apparatus, the test cases execute on a plurality of cloned hosts.

According to yet another aspect of the apparatus, the test cases are executed in concurrent synchronization.

According to still another aspect of the apparatus, the test cases are executed in sequential synchronization.

In yet another aspect of the apparatus, a synchronization step of a first one of the test cases is executed in a different execution interval than a corresponding synchronization step of a second one of the test cases.

According to still another aspect of the apparatus, the test cases include a gap occurring at one of the synchronization steps.

According to still another aspect of the apparatus, the gap includes a plurality of gaps randomly distributed at different synchronization steps.

According to an additional aspect of the apparatus, the gap includes a plurality of gaps that are systematically distributed among the synchronization steps.

Yet another aspect of the apparatus includes a pattern generator, which outputs synchronization patterns to the execution engine, the synchronization patterns providing a predetermined independence coverage degree for the test cases.

According to one aspect of the apparatus, the pattern generator pre-computes the synchronization patterns prior to operation of the execution engine.

According to another aspect of the apparatus, the pattern generator generates the synchronization patterns dynamically.

According to a further aspect of the apparatus, the pattern generator is adaptive to the response of the system-under-test.

According to still another aspect of the apparatus, an input of the pattern generator also includes an alphabet of test steps, a string of the alphabet, and a specification of a number of concurrent processes to be executed in the system-under-test.

According to an additional aspect of the apparatus, the alphabet includes a gap.

According to a further aspect of the apparatus, the pattern generator includes an optimizer for minimizing a number of the synchronization patterns that are generated therein.

The invention provides a method for verification of a system implementation, including the steps of generating a test program for execution on a system-under-test, producing a behavioral model of the system-under-test, organizing a plurality of test cases of the test program into discrete synchronization steps, stimulating the system-under-test according to the test program, to cause the system-under-test to concurrently execute the test cases synchronously, and comparing a response of the system-under-test upon completion of synchronization steps with a predicted result according to the behavioral model.

An aspect of the method includes constructing a behavioral simulator of the behavioral model.

In an aspect of the method, stimulating the system-under-test is performed by concurrently executing one of the test cases in a first cloned object and in a second cloned object.

In yet another aspect of the method stimulating the system-under-test includes executing a plurality of different test cases on a plurality of cloned objects.

In one aspect of the method, stimulating the system-under-test includes executing a plurality of different test cases on a plurality of different objects.

In another aspect of the method, stimulating the system-under-test includes executing a plurality of cloned processes.

In a further aspect of the method, stimulating the system-under-test includes executing the test cases on a plurality of cloned hosts.

In yet another aspect of the method stimulating the system-under-test includes executing the test cases in concurrent synchronization.

In still another aspect of the method stimulating the system-under-test includes executing the test cases in sequential synchronization.

In an additional aspect of the method stimulating the system-under-test includes executing a synchronization step of a first one of the test cases in a different execution interval than a corresponding synchronization step of a second one of the test cases.

In one aspect of the method stimulating the system-under-test includes separating two of the synchronization steps by a gap.

According to one aspect of the method, the gap includes a plurality of gaps randomly distributed at different ones of the synchronization steps.

According to another aspect of the method, the gap includes a plurality of gaps that are systematically distributed among the synchronization steps.

Another aspect of the method includes generating a plurality of synchronization patterns, the synchronization patterns providing a predetermined independence coverage degree for the test cases.

In yet another aspect of the method generating the plurality of synchronization patterns is performed dynamically.

In still another aspect of the method generating the plurality of synchronization patterns is performed responsive to the response of the system-under-test.

In a further aspect of the method generating the synchronization patterns is performed by specifying an alphabet of test steps, defining a string of the alphabet, and specifying a number of concurrent processes to be executed in the system-under-test.

According to yet another aspect of the method, the alphabet includes a gap.

In still another aspect of the method step of generating the synchronization patterns includes minimizing a number of the synchronization patterns.

The invention provides a computer software product for verification of a system implementation, including a computer-readable medium in which computer program instructions are stored, which instructions, when read by a computer, cause the computer to execute the steps of generating a test program for execution on a system-under-test, producing a behavioral model of the system-under-test, constructing a behavioral simulator for the behavioral model, organizing a plurality of test cases of the test program into discrete synchronization steps, stimulating the system-under-test according to the test program, to cause the system-under-test to concurrently execute the test cases synchronously in the synchronization steps, and comparing a response of the system-under-test upon completion of one of the synchronization steps with a predicted result according to the behavioral model.

The invention provides a method for verification of a system implementation, including the steps of generating a test program for execution on a system-under-test, the test program including a plurality of processes, producing a behavioral model of the system-under-test, constructing a behavioral simulator of the behavioral model, generating a synchronization pattern for each of the processes, and stimulating the system-under-test according to the test program, wherein each of the processes execute concurrently in synchronization steps, according to the synchronization pattern. The method includes delaying during an execution interval until each of the processes has completed a respective one of the synchronization steps, and thereafter comparing a response of the system-under-test with a predicted result according to the behavioral model.

The invention provides a computer software product, including a computer-readable medium in which computer program instructions are stored, which instructions, when read by a computer, cause the computer to perform a method for verification of a system implementation, including the steps of generating a test program for execution on a system-under-test, the test program including a plurality of processes, producing a behavioral model of the system-under-test, constructing a behavioral simulator based on the behavioral model, generating a synchronization pattern for each of the processes, stimulating the system-under-test according to the test program, wherein each of the processes execute concurrently in synchronization steps, according to the synchronization pattern. The method includes delaying during an execution interval until each of the processes has completed a respective one of the synchronization steps, and thereafter comparing a response of the system-under-test with a predicted result according to the behavioral model.

The invention provides an apparatus for verification of a system implementation, including a test program generator for generating a test program for execution on a system-under-test, the test program including a plurality of processes, wherein the test program generator accesses a behavioral model of the system-under-test and responsive to the behavioral model, the test program generator constructs a behavioral simulator of the system-under-test. The apparatus includes a pattern generator for generating a synchronization pattern for each of the processes, an execution engine for stimulating the system-under-test according to the test program, wherein each of the processes execute concurrently in synchronization steps, according to the synchronization pattern. The execution engine delays the termination of an execution interval until each of the processes has completed a respective one of the synchronization steps. The apparatus includes a validation engine for comparing a response of the system-under-test with a predicted result according to the behavioral model.

BRIEF DESCRIPTION OF THE DRAWINGS

For a better understanding of these and other objects of the present invention, reference is made to the detailed description of the invention, by way of example, which is to be read in conjunction with the following drawings, wherein:

FIG. 11 is a block diagram illustrating in further detail the execution engine and the validation engine used in the system shown in FIG. 1 in accordance with an alternate embodiment of the invention;

FIGS. 12A–12B, collectively referred to herein as FIG. 12, are flow charts illustrating a method of model based test generation for validation of parallel and concurrent software in accordance with a preferred embodiment of the invention; and FIGS. 13A–13B collectively referred to herein as FIG. 13, are flow charts illustrating a method of model based test generation for validation of parallel and concurrent software in accordance with an alternate embodiment of the invention.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances well-known circuits, control logic, and the details of computer program instructions for conventional algorithms and processes have not been shown in detail, in order not to unnecessarily obscure the present invention.

Software programming code, which embodies aspects of the present invention, is typically maintained in permanent storage, such as a computer readable medium. In a client/server environment, such software programming code may be stored on a client or a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and distributing software code via networks are well-known and will not be further discussed herein.

Definitions.

As used herein, the term "system" or "system under test" means a software system or a hardware system, the implementation of which is to be verified.

Architectural Overview.

Figure 1:
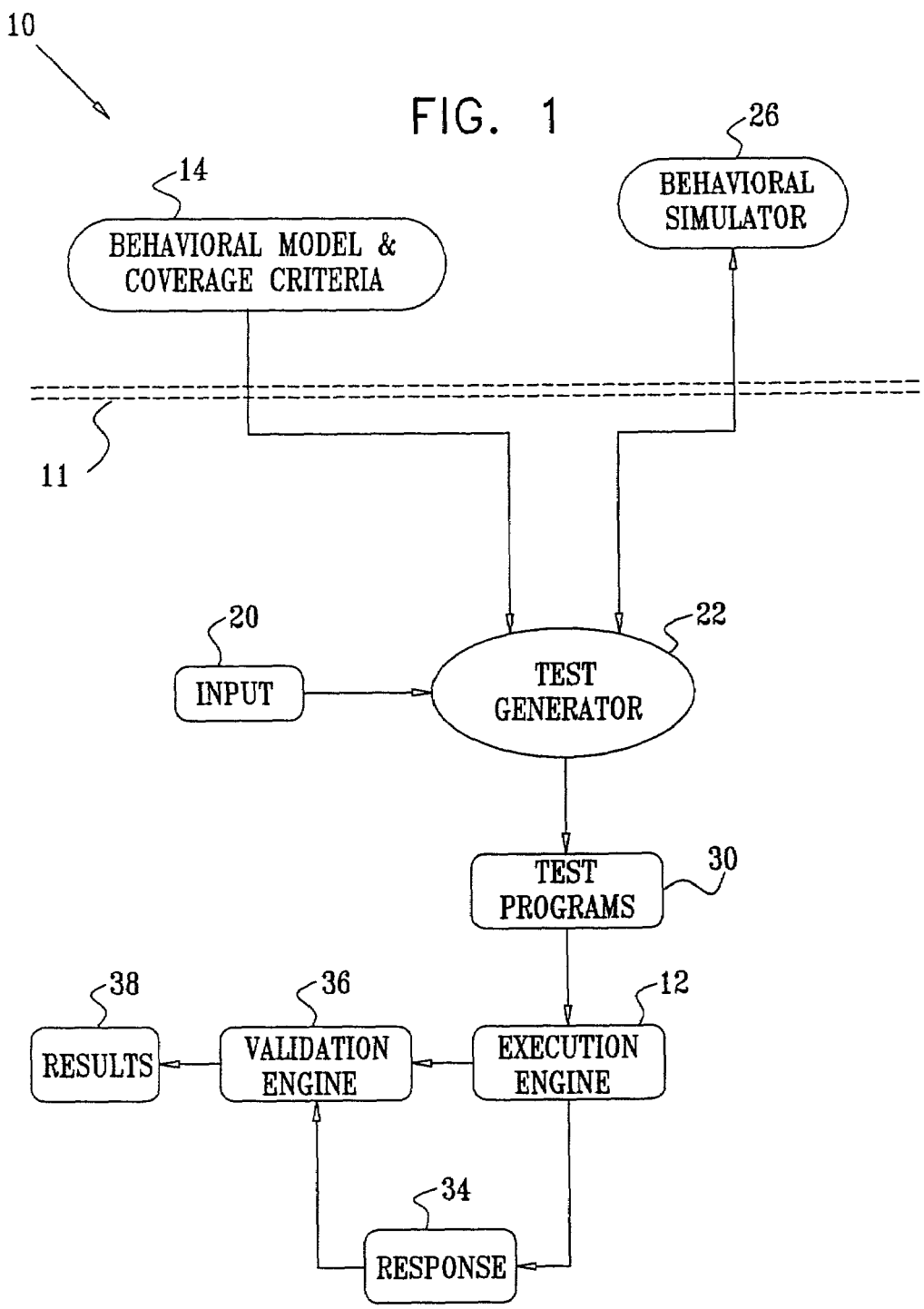
FIG. 1 is a block diagram of a design verification system that is constructed and operable in accordance with a preferred embodiment of the invention.

Turning now to the drawings, reference is made to FIG. 1, which is a block diagram of a verification system that is operable in accordance with a preferred embodiment of the invention. A verification system 10, used for verifying a software or hardware implementation, has several basic interacting components. Those components of the verification system 10 that are located above a broken line 11 are dependent on the specification of the implementation being verified, while those located below the line 11 are independent of the specification.

The verification system 10 enables the creation of tests that have various degrees of randomness. The ability of the verification system 10 to introduce random unspecified values is fundamental, since design flaws in practice are usually unpredictable.

An abstract behavioral model 14 holds a formal description of the specification of the system. This specification may be stored in a database, which may also incorporate testing knowledge of the system design (in our system these may be testing constraints and coverage criteria). The integration of all the information stored in the behavioral model 14 is referred to herein as the knowledge base of the verification system 10.

A generic test program generator engine 22 has a user input 20, which influences the test program generator engine 22. The influence of the input 20 includes, for example, the identity of the test instructions, their relative order, and various events relating to the instructions.

A behavioral simulator 26 is preferably constructed by the test generator from the behavioral model 14 by the test program generator engine 22. This construction can be performed "on-the-fly", or as a separate off-line procedure. In either case, the behavioral simulator 26 is transparent to the user. The behavioral simulator 26 is used to develop the behavioral model 14, and to predict the results of instruction execution in accordance with the specification of the system being verified.

The test program generator engine 22 may also receive some generic knowledge of the design specification, and can exploit this knowledge so as to generate sequences of instructions to form the test programs 30. The test programs 30 are executed by an execution engine 12 on an implementation of the system under test. The system can be a complex software implemented system, for example middleware, or a hardware simulator. Indeed, the system itself may be a simulator.

Execution of the test programs 30 produces a response 34 from the system. The response 34 is submitted to a validation engine 36, which has knowledge of the expected response, validates the response 34, and produces validation results 38.

Figure 2:
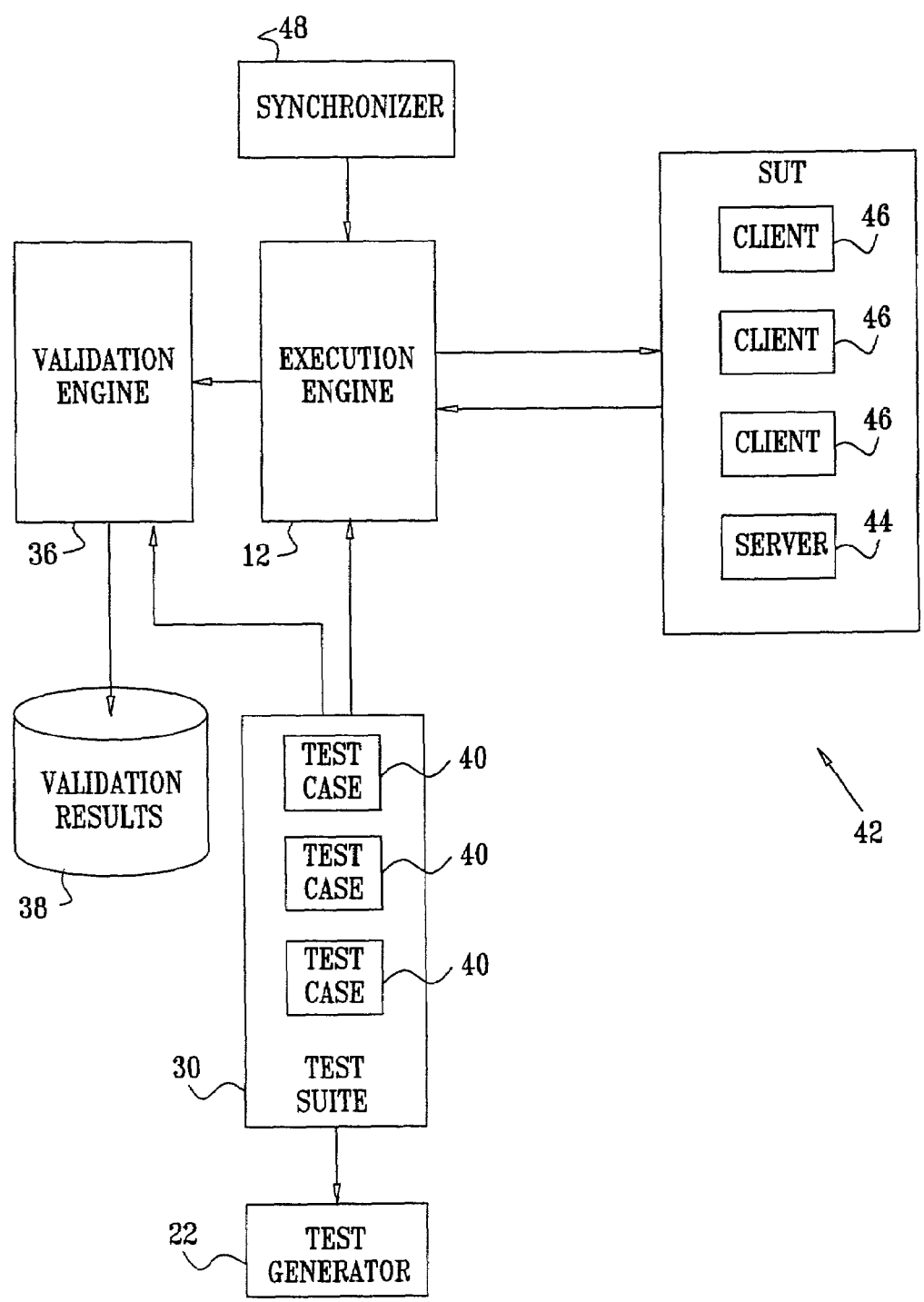
FIG. 2 is a block diagram illustrating in further detail the execution engine and the validation engine used in the system shown in FIG. 1.

Reference is now made to FIG. 2, which is a block diagram illustrating the execution engine 12 (FIG. 1) and the validation engine 36 in further detail. The description of FIG. 2 should be read in conjunction with FIG. 1. The execution engine 12 is initially programmed by the test program generator engine 22 with one of the test programs 30, which comprises a suite of test cases 40. The test cases 40 act as sequences of stimuli to a system-under-test 42 (SUT). The execution engine 12 thus maps operations described by the behavioral model 14 to a stimulus for the system-under-test 42. The system-under-test 42 is represented in FIG. 2 by a server 44 having a plurality of clients 46. However, as noted above, the system-under-test 42 could be any form of software. For example, the system-under-test 42 could be a non-traditional type of software, such as a hardware simulator. In addition to providing input for the execution engine 12, the test cases 40 include expected results of the execution of the test case by the execution engine 12. These expected results are provided to the validation engine 36. The output of the validation engine 36 is logged as validation results 38.

The execution engine 12 is provided with a synchronizer 48, which produces synchronizing control signals that are adapted to synchronize operations specified by each of the test cases 40. The execution engine 12 is responsive to the control signals of the synchronizer 48, and regulates its operations such that concurrently executing test cases, or multiple concurrently executing instances of a particular test case, stimulate the system-under-test 42 in discrete synchronization steps or phases. This is referred to herein as "step synchronization". The terms "concurrent" and "parallel", as used herein encompass both real and simulated concurrency and parallelism, as employed in practical computing environments. The phases or synchronization steps may be defined by application-specific indicators of progress of execution, for example by predefined events, or by time intervals. In any case, the intervals in which synchronization steps occur are referred to herein as "execution intervals".

Corresponding steps of independent test suites, or of different instances of the same test suite can execute in phase, or the corresponding synchronization steps of two processes can be offset from one another, meaning that they execute in different execution intervals. For instance, the test suites generated by a database read/write behavior model could be run alongside a backup and recovery behavior model of the same database.

In this embodiment the synchronization pattern developed by the synchronizer 48 is developed in accordance with a predetermined algorithm, so as to provide a desired degree of test coverage, which optionally is exhaustive. However, in order to limit the number of tests, the synchronization steps may include a given number of gaps. The use of gaps is a flexible technique that insures that a desired degree of test coverage using a minimum number of test runs. In some embodiments, the gaps are inserted randomly. In other embodiments, gaps can be inserted systematically, for example at regular intervals, and in series in which the intervals vary in a predetermined manner. For example, in a test suite, gaps could be inserted in alternate phases of execution in a first series of test runs, and at every third phase of execution in a second series of test runs.

Distribution, Multiplication and Synchronization of SUT Objects.

Continuing to refer to FIG. 2, in complex systems the system-under-test 42 could be a subsystem. In such a case, it is possible to replicate the system-under-test 42, so that it could execute on many remote hosts. The functional test suites executed by the execution engine 12 can be readily reused in tests of a larger system.

In general the system-under-test 42 consists of different entities, which need to be modeled in order to achieve adequate validation of the system as a whole. In the case of a database system, models are developed for the user, file, client, server, and database organization. In a practical database system, there are many files, users, and even servers referring to the same database. It may be expected that, for example, the behavior of a system having two users, five files, two clients, and one server would be the same as a system having five users, ten files, eight clients and two servers.

When the number of objects does not affect the behavior of the whole system, the number of objects is a parameter of execution. Such objects are referred to as "mutually independent objects". Their replication is called "object multiplication" or "cloning".

For example, if the system-under-test is a time server and a client, the client can be cloned. The clones connect to the time server and request the time. The behavior of such a system does not depend on the number of clients or clones. Each clone is the exact copy of the other. However, the individual clones can be initialized differently.

There are two types of synchronization of cloned objects: concurrent and sequential.

Concurrent synchronization means that each transition of a test case affects all clones at the same time. The next transition does not start until the previous one is ended on all clones.

Figure 3:
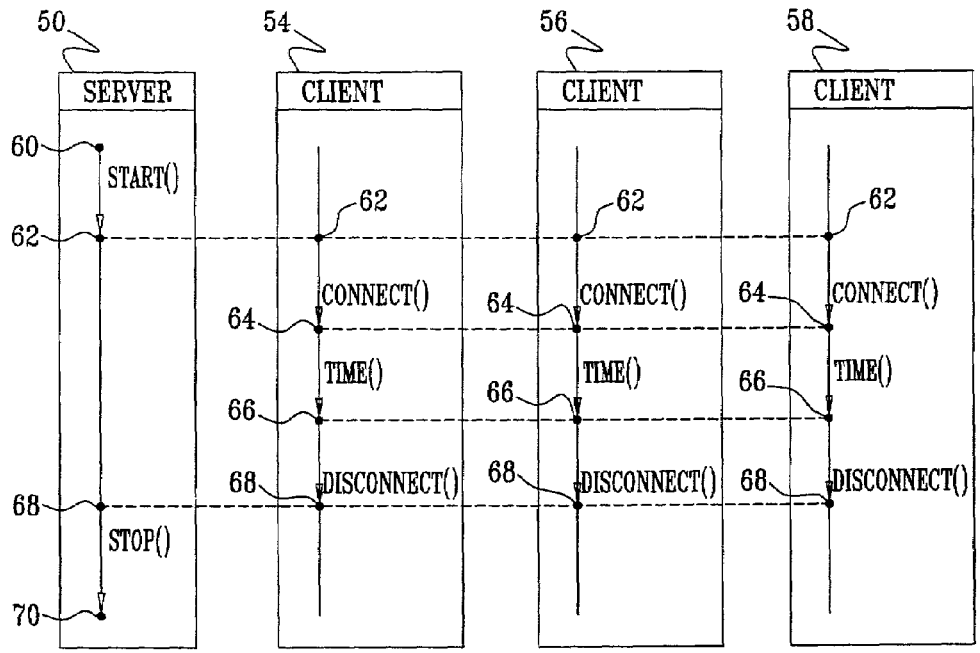
FIG. 3 is a diagram illustrating concurrent synchronization in accordance with a preferred embodiment of the invention.

Reference is now made to FIG. 3, which is a diagram illustrating concurrent synchronization in accordance with a preferred embodiment of the invention. A time server 50 is accessible by a client 52 which has been replicated into three clones 54, 56, 58. Only one replicated client, the client 52, is shown for purposes of clarity. However, it will be understood that the time server 50 could be accessed by many different clients, each having different numbers of its own clones. The arrows in FIG. 3 represent transitions. Dots represent points of synchronization. Thus operation of the time server 50 is initiated during a common execution interval defined by synchronization points 60, 62. Next, during an execution interval defined by synchronization points 62, 64, the clones 54, 56, 58 all connect simultaneously to the time server 50. Next, during a common execution interval defined by synchronization points 64, 66, the clones 54, 56, 58 request the time from the time server 50. Then, during a common execution interval defined by synchronization points 66, 68, the clones 54, 56, 58 disconnect from the time server 50. The time server 50 then terminates operation during an execution interval defined by synchronization point 68, 70.

Sequential synchronization means that a transition of one clone does not begin before it ends on a previous clone.

Figure 4:
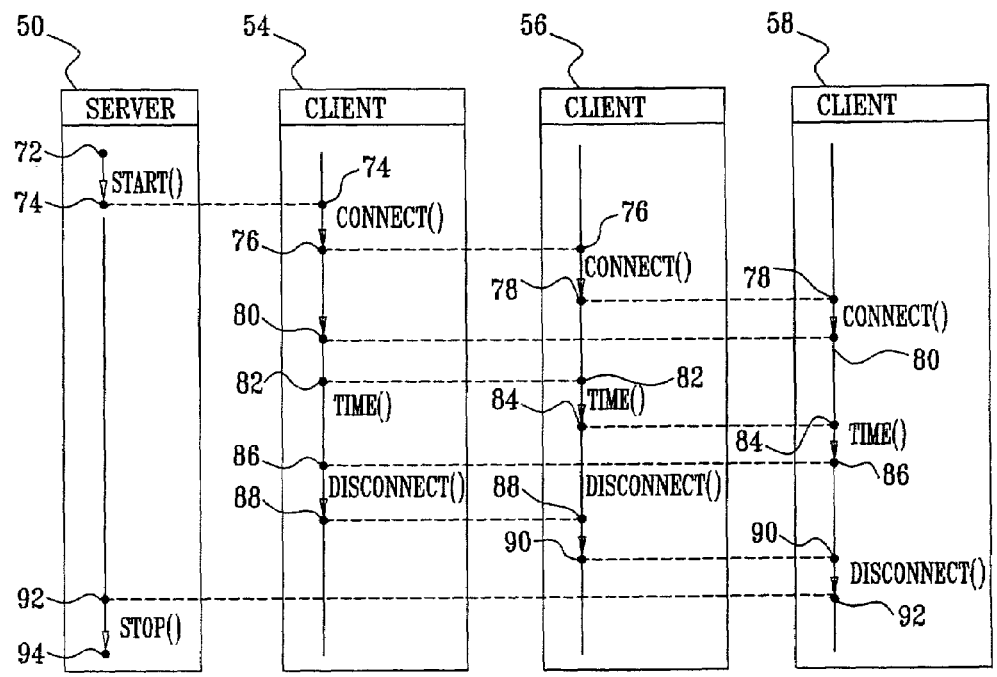
FIG. 4 is a diagram illustrating sequential synchronization in accordance with a preferred embodiment of the invention.

Reference is now made to FIG. 4, which is a diagram illustrating sequential synchronization in accordance with a preferred embodiment of the invention. FIG. 4 is similar to FIG. 3, in which like components are given like reference numerals, and the significance of the arrows and dots is the same. Thus, operation of the time server 50 is initiated during an execution interval defined by synchronization points 72, 74. Next, during an execution interval defined by synchronization points 74, 76 the clone 54 connects to the time server 50. Next, during an execution interval defined by synchronization points 76, 78, the clone 56 connects to the time server 50. Next, during an execution interval defined by synchronization points 78, 80 the clone 58 connects to the time server 50. It will be noted that the three intervals are exclusive.

After all of the clones 54, 56, 58 have connected to the time server 50 requests for time occur. First, during an execution interval defined by synchronization points 80, 82 the clone 54 requests the time from the time server 50. Next, during an execution interval defined by synchronization points 82, 84 the clone 56 requests the time from the time server 50. Next, during an execution interval defined by synchronization points 84, 86 the clone 58 requests the time from the time server 50.

The clones 54, 56, 58 now disconnect sequentially. First, during an execution interval defined by synchronization points 86, 88 the clone 54 disconnects from the time server 50. Next, during an execution interval defined by synchronization points 88, 90 the clone 56 disconnects from the time server 50. Next, execution during an interval defined by synchronization points 90, 92 the clone 58 disconnects from the time server 50. Finally, during an execution interval defined by synchronization points 92, 94 the time server 50 terminates its operation.

Generally a system-under-test consists of units-under-test or processes, which are composed in turn of objects-under-test, and which can run on different host machines. Three levels of multiplication can be defined. Host multiplication occurs when all processes running on the one host machine are cloned to another machine. Process multiplication occurs when a process, including all of its objects, are cloned on the same host machine. Object multiplication occurs when an object is cloned within a process.

Figure 5:
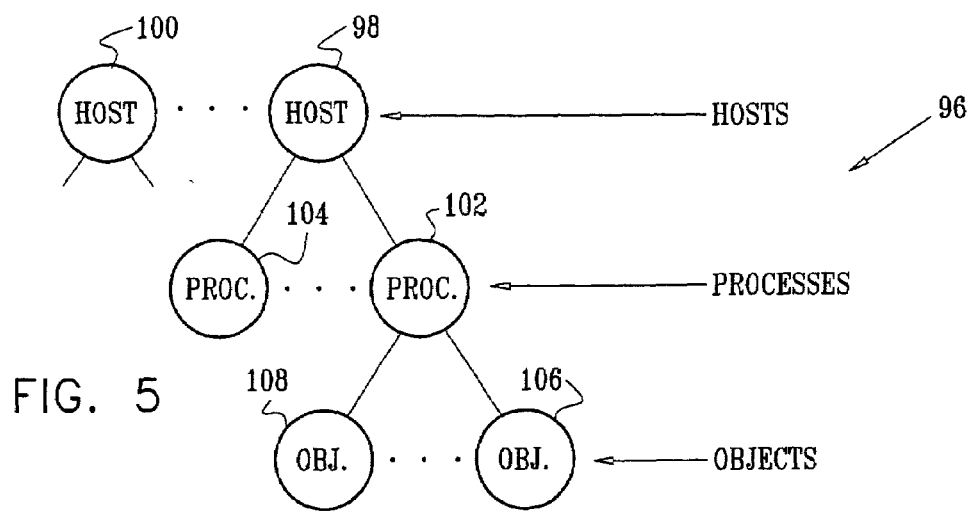
FIG. 5 is a schematic illustrating a hierarchy of cloned entities in a system-under-test according to a preferred embodiment of the invention.

Reference is now made to FIG. 5, which illustrates a hierarchy 96 of entities in a system-under-test. The hierarchy 96 includes hosts 98, 100, processes 102, 104, and objects 106, 108. In test execution directives provided to the execution engine 12 (FIG. 1), an initialization set can be assigned to each entity of the hierarchy 96. When individually specifying values in each initialization set, values of the initialization set of the higher levels of the hierarchy 96 may be referenced. For example, as shown in of Listing 1, which represents fragments of initialization sets, an object initialization set symbolically references elements of both a process initialization set and a host initialization set.

| Listing 1 |
|---|
| Host Initialization Set: |
|    IP = 9.148.32.112 |
| Process Initialization Set: |
|    USER = Joe |
| Object Initialization Set |
|    IP = HOST.IP |
|    USER = PROCESS.USER |

It should be noted that the goal of object multiplication and cloning is to validate the functional behavior of the system under test, rather than to test its performance. This is an efficient approach since it reuses an existing test suite. When object multiplication is performed, it will generally be the case that the test suite has previously run successful without object multiplication. Thus, any problems discovered subsequently can be attributed to the introduction of more objects into the system-under-test.

Initialization.

Continuing to refer to FIG. 2, when the execution engine 12 in cooperation with the synchronizer 48 creates the various above-described entities (FIG. 5) in the system-under-test 42, it initializes them with an initialization set. This may be empty, but generally, it contains name-value pairs.

Cloning.

Continuing to refer to FIG. 5, each entry of an initialization set for different elements of the same level of the hierarchy 96 can be given different values, in order to initialize clones differently, for example, the clones represented by the objects 106, 108. Values are assigned to the clones in sequence. Thus, a first value could be assigned to the initialization set of the object 106, and a second value to the object 108. If a value list representing the clones is exhausted, then the assignment cycles back to the beginning of that value list in order to continue the process.

In another example, an object "lamb" is to be cloned, and four clones are desired. The initialization set for the objects is shown in Listing 2.

| Listing 2 | |
|---|---|
| FUR_COLOR: | white |
| EYE_COLOR: | blue, green |
| NAME: | Mercury, Venus, Earth |

Applying the assignments of the values cyclically as described above yields four white lambs: Mercury with blue eyes, Venus with green eyes, Earth with blue eyes, and Mercury with green eyes.

EXAMPLES

Figure 6:
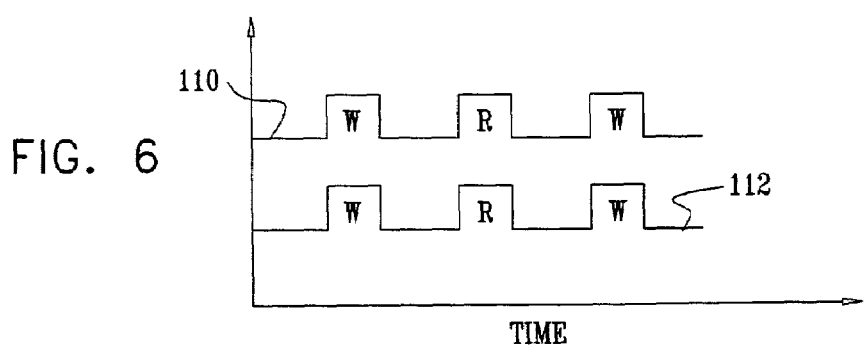
FIG. 6 is a timing diagram illustrating an operation of a synchronizer of the execution engine shown in FIG. 2 according to a preferred embodiment of the invention.

Reference is now made to FIG. 6, which is a timing diagram illustrating an exemplary operation of the synchronizer 48 in cooperation with the execution engine 12. FIG. 6 models an example of database read/write behavior, wherein the symbol "R" refers to a read operation, and the symbol "W" refers to a write operation, and can be understood in conjunction with FIG. 2. According to stimuli issued by the execution engine 12 to the system-under-test 42, different clients 46 are executing the same sequence of read/write operation. The read and write operations of a first process, shown as a sequence 110, and those of a second process, shown as a sequence 112, are shown executed in phase.

Figure 7:
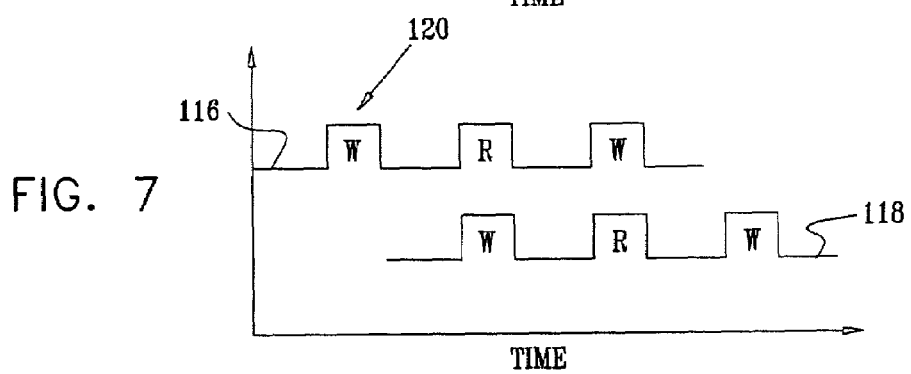
FIG. 7 is a timing diagram illustrating another operation of the synchronizer of the execution engine shown in FIG. 2 according to a preferred embodiment of the invention.

Reference is now made to FIG. 7, which is a timing diagram illustrating another exemplary operation of the synchronizer 48 in cooperation with the execution engine 12, similar to the behavioral model 14. Now different clients 46 are executing the same sequence of read/write operations. Now, however, the read and write operations of a first process, shown as a sequence 116, and those of a second process, shown as a sequence 118, are executed in different execution intervals. For example, the first operation of the first and second processes occurs respectively in successive execution intervals 120. They are offset from one another by one execution interval.

Figure 8:
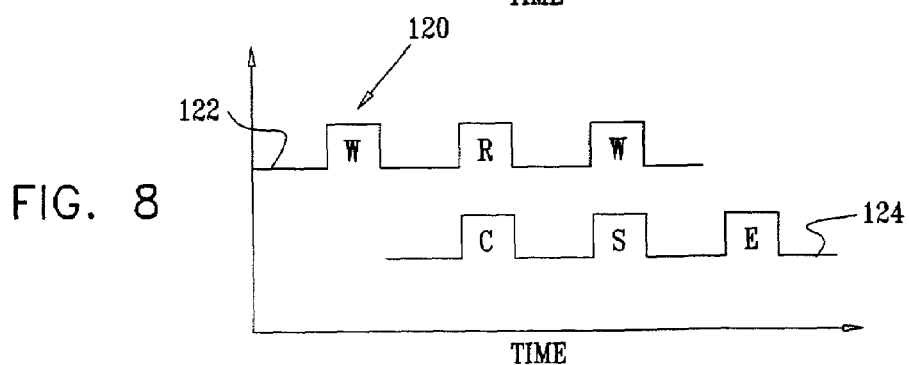
FIG. 8 is a timing diagram illustrating another operation of the synchronizer of the execution engine shown in FIG. 2 according to a preferred embodiment of the invention.

Reference is now made to FIG. 8, which is a timing diagram illustrating another exemplary operation of the synchronizer 48 in cooperation with the execution engine 12. Two different test cases, one a read/write operation, and the other a backup and recovery operation, are used to stimulate the system-under-test 42. Here the symbols "R" and "W" have the meanings given above. The symbol "C" means "configure backup"; "S" means start backup, and "E" means inject error. A first process, the read/write operation, is shown as a sequence 122, and a second process, the backup and recovery operation, is shown as a sequence 124.

Figure 9:
FIG. 9 is a diagram showing sequences representing the execution of two independent concurrent processes by an execution engine in a first mode of operation, in accordance with a preferred embodiment of the invention.

Referring again to FIG. 2, in another mode of operation, the execution engine 12 can "split" any of the test programs 30. That is to say, the execution of the test programs 30 can be interrupted for any length of time, and then resumed. To illustrate this mode of operation, reference is now made to FIG. 9, which illustrates sequences representing the execution of two independent concurrent processes. Steps of a first concurrent process 126 are represented by upper case letters, and steps of a second concurrent process 128 are shown in lower case letters. FIG. 9 shows three tests, in which the execution engine 12 executes the two test cases with different beginning offsets. In a first test 130, the two processes begin simultaneously. In a second test 132, the second process is initiated one execution interval prior to the initiation of the first process. In a third test 134, the first process is initiated two execution intervals prior to the initiation of the second process.

Figure 10:
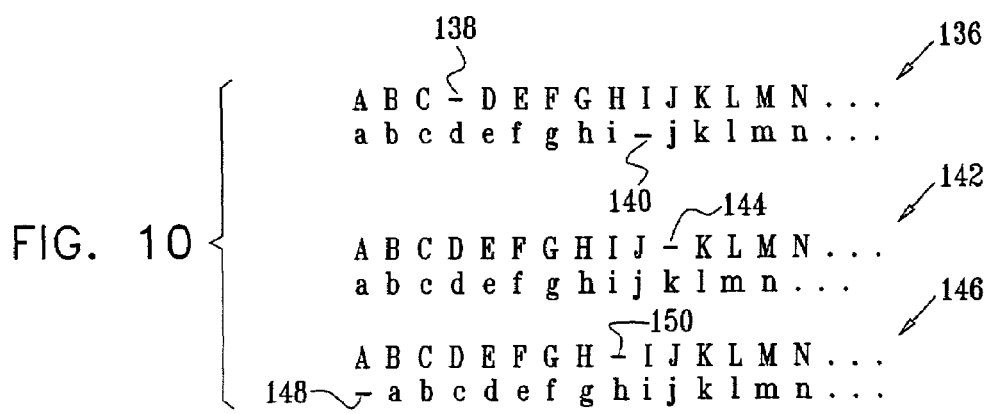
FIG. 10 is a diagram showing sequences representing the execution of two independent concurrent processes by an execution engine in a second mode of operation, in accordance with a preferred embodiment of the invention.

Reference is now made to FIG. 10, which illustrates sequences representing the execution of two independent concurrent processes according to another mode of operation of the synchronizer 48. FIG. 10 is similar to FIG. 9, except now splits or gaps, represented by the symbol "–", have been introduced in the tests.

In a first test 136 two concurrent processes begin simultaneously. A gap 138 has been introduced in the first process between synchronization steps "C" and "D". A gap 140 has been introduced between synchronization step "i" and synchronization step "j" in the second process. Corresponding synchronization steps of the two processes are executed out of step between the gaps 138, 140. Following the gap 140, corresponding synchronization steps of the two processes again execute in the same execution interval. Gaps can be inserted at the beginning of a test case, at the end, or between two synchronization steps.

In a second test 142, the two concurrent processes begin simultaneously, and execute in step until the introduction of a gap 144. Subsequent corresponding synchronization steps of the two processes execute out of phase, separated by one execution interval. Thus, synchronization step "K" of the first process executes concurrently with synchronization step "l" of the second process.

In a third test 146, a gap 148 precedes the first synchronization step "a" of the second process, so that the first process actually begins executing one execution interval prior to the second process. The two processes are out of phase by one execution interval until synchronization steps "I" and "i" of the first and second process respectively. Synchronization has been stored by inserting a gap 150 between synchronization step "H" and synchronization step "I" of the first process.

From a consideration of FIG. 10, it can be appreciated that many more possibilities of interaction can be tested, as compared with the arrangement of FIG. 9. For example, although only one gap has been introduced into any one of the sequences shown in FIG. 10, several consecutive gaps could be introduced, thus creating any desired delay in the execution of a given process. Advantageously, in the mode of operation illustrated in FIG. 10, problems resulting from race conditions are likely to be detected. If the number of gaps is limited, such problems can be detected with less computation than in the mode of operation illustrated in FIG. 9.

Alternate Embodiment.

In the discussion of the first embodiment the use of model based test generation techniques is disclosed, wherein a simple sequential test case is converted into a set of concurrent test cases, which can be used to validate a system-under-test without producing an impractical number of additional test cases. In this alternate embodiment, synchronization of concurrent test cases is extended to cover a much wider variety of process state combinations.

Referring again to FIG. 9, it is shown that the processes 126, 128 can be tested with different initial synchronization step offsets. In order to test the independence of all pairs of steps in the two processes 126, 128, it is necessary to run the test cases together m+n times, where m is the number of synchronization steps of the process 126, and n is the length of the process 128. However, as more processes are tested together, the number of repetitions required to test for the independence of all 3-tuples in the case of three concurrent processes, or 4-tuples in the case of four concurrent processes, increases as the square or cube of the number of synchronization steps respectively.

Similarly if there are p processes, and it is desired to test for all patterns of p steps interacting together, the number of possible patterns is $m^p$, assuming that each test case has m distinct synchronization steps. It would require at least $m^{p-1}$ repetitions to evaluate all such combinations, since at most m combinations can be observed at any one repetition.

Reference is now made to FIG. 11, which is a block diagram illustrating in further detail the execution engine and the validation engine used in the system shown in FIG. 1 according to an alternate embodiment of the invention. The embodiment of FIG. 11 is similar to that of FIG. 2, and like elements are given like reference numerals. However, in this embodiment a synchronization pattern generator 152 generates synchronization patterns 154, which are input to the execution engine 12.

In some embodiments, the synchronization patterns 154 are developed in advance of the operation of the execution engine 12. In such embodiments the pattern generator 152 operates off-line, and stores pre-computed synchronization patterns. Appropriate logic is provided in the pattern generator 152 for the timely selection of the synchronization patterns 154.

In other embodiments, the synchronization patterns 154 are dynamically generated. The pattern generator 152 receives feedback input from the execution engine 12 or the validation engine 36, as indicated by the dashed line 156. In such embodiments, the synchronization patterns 154 are influenced by the results of execution by the execution engine 12. Adaptive generation of synchronization patterns is important in two cases. In the first case, the model of the system-under-test is non-deterministic. That is, the behavioral model is a more abstract representation of the specification than the implementation. In this case, the model may predict one or more outcomes of a particular stimulus. The execution engine and the validation engine could observe which of the valid or invalid responses were received, and decide whether to insert a gap, based on both the observed response, and the current coverage criteria. In the second case, the test system itself is non-deterministic. Here too, the observed responses and current coverage situation could motivate the test execution engine to insert a gap in order to increase the likelihood of reaching an uncovered synchronization task later in the test case.

In this embodiment, repetitions and gap insertions of each test case are generated by the pattern generator 152, and the synchronizer 48 is responsive, in order for the test program generator engine 22 to cover a prescribed degree of independence, referred to as an "independence coverage degree". An independence coverage degree could be pairs of steps in two or more concurrent processes, triples of steps, and all possible combinations of steps.

The issue of practical synchronization pattern generation can be explained as follows: The input is:

1. A finite alphabet of symbols called test steps, denoted by an alphabet of size n;
2. A finite string of symbols over the alphabet (called a test case), having a length m;
3. A number of concurrent processes k; and
4. A coverage requirement (independence coverage degree).

The output is a set of test runs or synchronization patterns. A test run is a set of k strings over the alphabet extended with the symbol gap. Each of the strings in a run consists of the original test case with gap symbols inserted.

A test run is said to cover a pair of alphabet members {x, y}, if the member x occurs at a position i in one of the sequences in the run and the member y also occurs at the same position i in a different sequence of the run. This notion of coverage is extended to triples and generally to n-tuples.

A good test synchronization solution is one with a small number of runs.

A special case of the test synchronization problem may be attacked using "difference sets" and "difference families", which are known from standard references on combinatorial design theory. If gaps are only allowed to be inserted at the beginning of a test case, and moreover, the test case can be repeated cyclically, and the test case consists of n different symbols. Then, a cyclic difference family with parameters 2–(n,k,1) can be used to construct a set of runs which cover all pairs of distinct alphabet symbols. A 2–(n,k,1) difference family is a set of k-subsets of the set of integers modulo n, with the property that the set of all differences between members of the same k-subset is precisely the set of all non-zero integers modulo n, each one occurring once, corresponding to the value 1 in the notation 2–(n,k,1)).

The name "cyclic balanced incomplete block design" is mathematically synonymous with a 2–(n,k,m) difference family.

The independence coverage degree can sometimes be satisfied using cyclic balanced incomplete block design, but in general this is not possible, as there are numerous restrictions. Gaps can occur only at the beginning of the test case. Repeats can only occur at the end or the beginning. The parameters m and n must be equal, and there can be no repeated steps in the test case. Furthermore, difference families can only exist when certain divisibility conditions are satisfied, e.g., n–1 must be divisible by k–1. For these and other reasons, difference families are impractical.

To illustrate an exemplary operation of the pattern generator 152, which produces a test having an independence coverage degree consisting of pairs, reference is made to Table 1. Table 1 illustrates three concurrent processes. A test case pattern for each process consists of the steps "A B A C D". It is required that all combinations of pairs of steps occur together during the tests. That is, each of the pairs of steps AA, AB, AC, AD, BB, BC, BD, CC, CD, and DD must occur together at some interval of the tests. Table 1 shows a succession of intervals, each occupied either by a gap, or by concurrently occurring steps of the processes.

TABLE 1

| Process 1 | — | A | B | A | C | D | — | — |
|---|---|---|---|---|---|---|---|---|
| Process 2 | — | — | — | A | B | A | C | D |
| Process 3 | A | B | A | C | D | — | — | — |

In this relatively simple example, using gaps, the pattern generator 152 can generate runs of the test case to achieve full coverage of these ten pairs in only two repetitions. The first repetition is shown in Table 1. A second repetition is shown in Table 2.

TABLE 2

| Process 1 | — | A | B | — | — | A | C | D |
|---|---|---|---|---|---|---|---|---|
| Process 2 | A | B | A | C | D | — | — | — |
| Process 3 | A | B | A | C | D | — | — | — |

Inspection of Table 1 shows that the pairs AB, AA, AC, BC, BD, CD, and AD are tested. For example, the pair AB is tested in the second and third intervals from the left. The pair AD is tested in the third interval from the right. The pairs BB, CC, and DD are not tested.

In the second repetition, shown in Table 2, the pairs AA, AB, BB, CC, and DD are tested. These pairs include the pairs BB, CC, and DD, which were not covered in the first repetition. The pairs AA and AB are incidentally retested. Thus, all ten pair sets are covered in only two repetitions.

Referring again to FIG. 11, the pattern generator 152 can be realized as a tool such as the above-noted GOTCHA-TCBeans Software Test Tool Kit or other finite state machine based test generators. A model can be readily created, which receives as input the number of concurrent processes, a single test case provided as a pattern of steps, (e.g., A B C D A E F), the length of the test case (in the foregoing pattern the length is 7), and an independence coverage degree requirement. The generator tool is modified to optimize the sequences by strategic insertion of gaps combined with variation of the process offsets, so as to satisfy the independence coverage degree, and stimulate the system-under-test with a minimum number of test repetitions. This operation can be done automatically, and may employ well-known optimization techniques such as simulated annealing and genetic algorithms.

Methods of Operation.

The steps of the following methods are presented in a particular order. However, it will be understood by those skilled in the art that many of these steps can be performed in different orders, or even simultaneously.

Figure 12B:
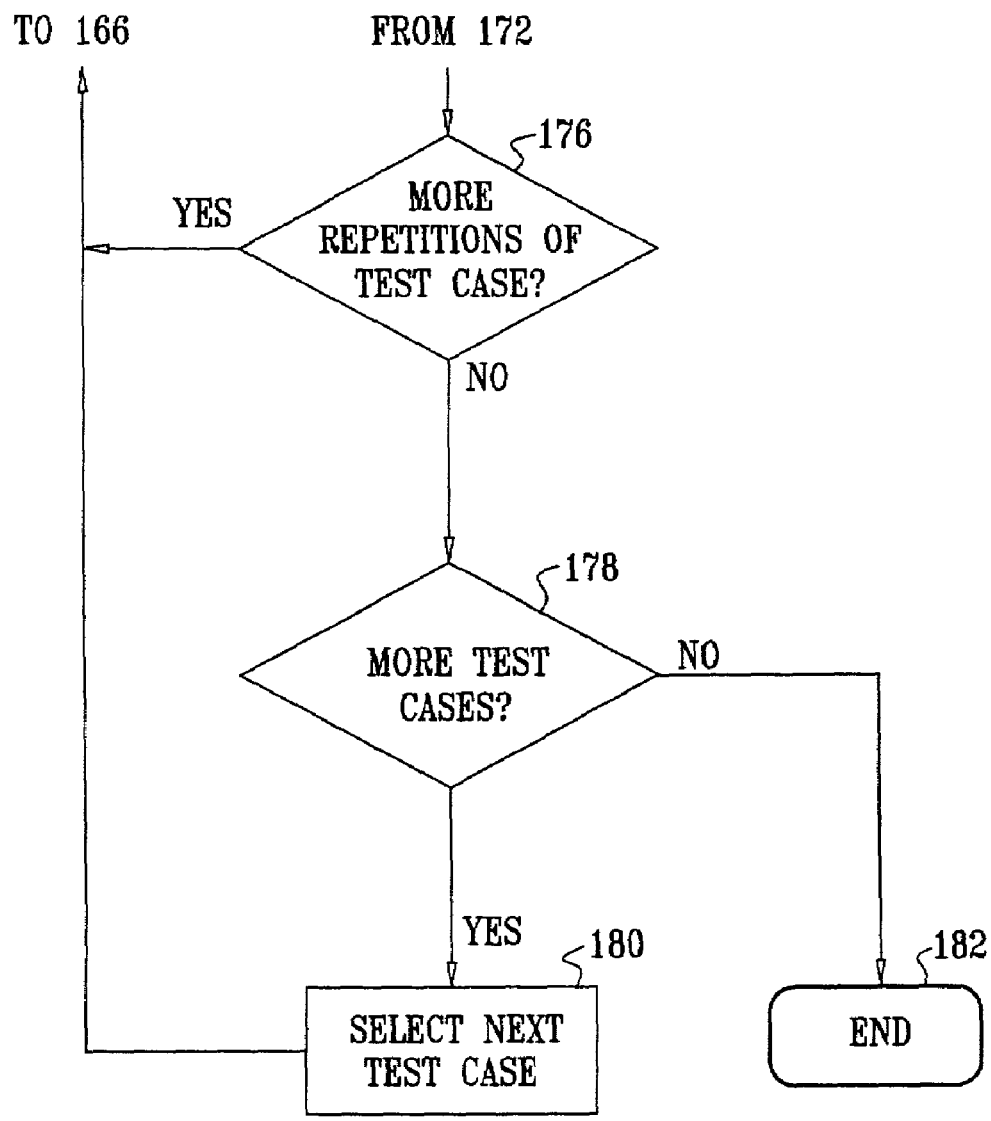

Reference is now made to FIG. 12, which is a flow chart illustrating a method of model based test generation for validation of parallel and concurrent software in accordance with a preferred embodiment of the invention, in which synchronization patterns are determined during operation of the test system. The process begins at initial step 158, where a behavioral model is prepared from the specifications of the system-under-test. A behavioral simulator is created from the behavioral model during initial step 158.

Next, at step 160 test coverage goals and test constraints are established. Control then proceeds to step 162, where a test suite is generated for a single process. In a test case of the test suite, a finite alphabet of symbols called test steps, denoted by an alphabet of size n is used. The test case is a finite string of symbols over the alphabet, having a length m; and a number of concurrent processes k.

Next, at step 164, the number of clones of the process for which the test suite was generated in step 162 is determined.

Next, at step 166 all clones, the number of which was determined in step 164, are spawned. The execution engine begins executing a test case of the test suite that was generated in step 162 on all the clones.

At step 168 the execution engine sends a stimulus, or a gap to the processes. This is done according to a decision algorithm, in which at least the information obtained in the previous steps, including the test coverage requirement, is employed in order to optimize the synchronization patterns, such that the system-under-test can be validated with a minimum number of test case repetitions. The processes execute step-wise in accordance with the synchronization patterns generated by step 168.

At step 170 responses to the stimulus of step 168 are observed and validated. Any implementation flaws that are detected during validation are recorded.

Next, at decision step 172 a determination is made whether there are steps remaining to be executed in any of the processes. If the determination at decision step 172 is affirmative, then control proceeds to step 174.

If the determination at decision step 172 is negative, then control proceeds to decision step 176, which is disclosed below.

At step 174 the next stimulus of the synchronization pattern is determined, based at least in part on the response of step 170. Whether this is to be a gap or a stimulus corresponding to another member of the alphabet is established according to the coverage criteria currently in force. Control then returns to step 168.

At decision step 176 it is determined if the current test case needs to be repeated. This determination is made according to the coverage goals that were input in step 160. If the determination at decision step 176 is affirmative, then control returns to step 166.

If the determination at decision step 176 is negative, then control proceeds to decision step 178. Here a determination is made whether more test cases of the test suite remain to be processed.

If the determination at decision step 178 is affirmative, then control proceeds to step 180, where another test case is selected. Control then returns to step 166.

If the determination at decision step 178 is negative, then control proceeds to final step 182, and the procedure ends.

Figure 13B:
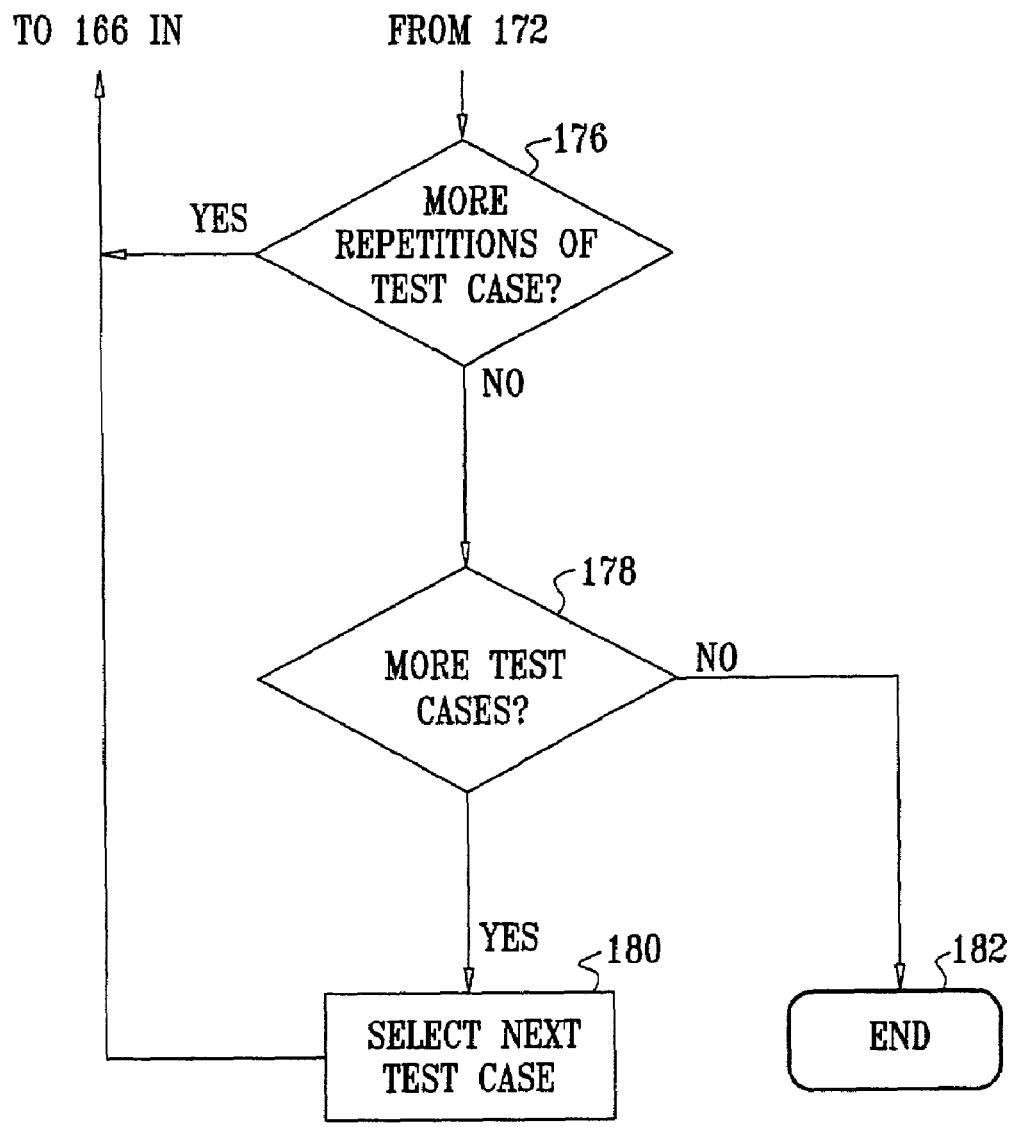

Reference is now made to FIG. 13, which is a flow chart illustrating a method of model based test generation for validation of parallel and concurrent software in accordance with another preferred embodiment of the invention, in which optimized synchronization patterns are computed prior to operation of the test system. Steps in FIG. 12 and FIG. 13 that are identical are given like reference numerals, and their descriptions are not repeated in the interest of brevity. The process begins at initial step 158. Initial step 158, step 160, step 162 and step 164 are performed in the same manner as disclosed above with reference to FIG. 12.

Next, at step 184 the test suite that was created in step 162 is expanded by computing optimized synchronization patterns for each test case of the test suite, using the methods disclosed hereinabove. Control then passes to step 166, the disclosure of which is given above.

Next, at step 186 the execution engine sends a stimulus, or a gap to the processes. The stimulus is selected from elements of the synchronization patterns that were pre-computed in step 184. As in step 168 (FIG. 12), the processes execute step-wise in response to the stimulus.

Control next passes to step 170, and then to decision step 172, which are disclosed above. If the determination at decision step 172 is affirmative, then control proceeds to step 188, where the next stimulus is selected. As the stimuli and their order are pre-computed, determined. The next stimulus can be read from a table or list. Control then returns to step 186.

If the determination at decision step 172 is negative, then control proceeds to decision step 176, and thence to decision step 178, step 180, and final step 182, the disclosures of which are given above in connection with FIG. 12.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art which would occur to persons skilled in the art upon reading the foregoing description.

The invention claimed is:

1. An apparatus for verification of a system implementation tangibly embodied on a computer-readable medium, comprising:
    a generator for generating a test program for execution thereof on a system-under-test;
    a synchronizer that organizes a plurality of test cases of said test program into discrete synchronization steps;
    an execution engine responsive to said synchronizer for stimulating said system-under-test according to said test program, to cause said system-under-test to concurrently execute said test cases synchronously in said synchronization steps;
    an automatic pattern generator comprising a finite state machine that outputs synchronization patterns to said execution engine, said synchronization patterns providing a predetermined independence coverage degree for said test cases; and
    a validation engine for comparing a response of said system-under-test upon completion of one of said synchronization steps with a predicted result.

2. The apparatus according to claim 1, wherein a behavioral simulator for said system-under-test is constructed by said generator using a behavioral model thereof.

3. The apparatus according to claim 1, wherein said test cases are executed in a first cloned object and a second cloned object.

4. The apparatus according to claim 1, wherein said test cases comprise a plurality of different test cases that execute on a plurality of cloned objects.

5. The apparatus according to claim 1, wherein said test cases comprise a plurality of different test cases that execute on a plurality of different objects.

6. The apparatus according to claim 1, wherein said test cases comprise a plurality of cloned processes.

7. The apparatus according to claim 1, wherein said test cases execute on a plurality of cloned hosts.

8. The apparatus according to claim 1, wherein said test cases are executed in concurrent synchronization.

9. The apparatus according to claim 1, wherein said test cases are executed in sequential synchronization.

10. The apparatus according to claim 1, wherein a synchronization step of a first one of said test cases is executed in a different execution interval than a corresponding synchronization step of a second one of said test cases.

11. The apparatus according to claim 1, wherein said test cases comprise a gap occurring at one of said synchronization steps.

12. The apparatus according to claim 11, wherein said gap comprises a plurality of gaps randomly distributed at different ones of said synchronization steps.

13. The apparatus according to claim 11, wherein said gap comprises a plurality of gaps that are systematically distributed among said synchronization steps.

14. The apparatus according to claim 1, wherein said pattern generator pre-computes said synchronization patterns prior to operation of said execution engine.

15. The apparatus according to claim 1, wherein said pattern generator generates said synchronization patterns dynamically.

16. The apparatus according to claim 15, wherein said pattern generator is adaptive to said response of said system-under-test.

17. The apparatus according to claim 1, wherein an input of said pattern generator further comprises:

an alphabet of test steps;
a string of said alphabet; and
a specification of a number of concurrent processes to be executed in said system-under-test.

18. The apparatus according to claim 17, wherein said alphabet comprises a gap.

19. The apparatus according to claim 1, wherein said pattern generator comprises an optimizer for minimizing a number of said synchronization patterns that are generated therein.

20. A method for verification of a system implementation tangibly embodied on a computer-readable medium, comprising the steps of:
generating a test program for execution on a system-under-test;
producing a behavioral model of said system-under-test;
organizing a plurality of test cases of said test program into discrete synchronization steps;
using a finite state machine to generate a plurality of synchronization patterns automatically, said synchronization patterns providing a predetermined independence coverage degree for said test cases;
stimulating said system-under-test according to said test program, to cause said system-under-test to concurrently execute said test cases synchronously in said synchronization steps; and
comparing a response of said system-under-test upon completion of one of said synchronization steps with a predicted result according to said behavioral model.

21. The method according to claim 20, further comprising the step of responsive to said behavioral model, constructing a behavioral simulator.

22. The method according to claim 20, wherein said step of stimulating said system-under-test is performed by concurrently executing one of said test cases in a first cloned object and in a second cloned object.

23. The method according to claim 20, wherein said step of stimulating said system-under-test comprises executing a plurality of different test cases on a plurality of cloned objects.

24. The method according to claim 20, wherein said step of stimulating said system-under-test comprises executing a plurality of different test cases on a plurality of different objects.

25. The method according to claim 20, wherein said step of stimulating said system-under-test comprises executing a plurality of cloned processes.

26. The method according to claim 20, wherein said step of stimulating said system-under-test comprises executing said test cases on a plurality of cloned hosts.

27. The method according to claim 20, wherein said step of stimulating said system-under-test comprises executing said test cases in concurrent synchronization.

28. The method according to claim 20, wherein said step of stimulating said system-under-test comprises executing said test cases in sequential synchronization.

29. The method according to claim 20, wherein said step of stimulating said system-under-test comprises executing a synchronization step of a first one of said test cases in a different execution interval than a corresponding synchronization step of a second one of said test cases.

30. The method according to claim 20, wherein said step of stimulating said system-under-test comprises separating two of said synchronization steps by a gap.

31. The method according to claim 30, wherein said gap comprises a plurality of gaps randomly distributed at different ones of said synchronization steps.

32. The method according to claim 30, wherein said gap comprises a plurality of gaps that are systematically distributed among said synchronization steps.

33. The method according to claim 20, wherein said step of generating said plurality of synchronization patterns is performed dynamically.

34. The method according to claim 33, wherein said step of generating said plurality of synchronization patterns is performed adaptive to said response of said system-under-test.

35. The method according to claim 20, wherein said step of generating said synchronization patterns is performed by:
specifying an alphabet of test steps;
defining a string of said alphabet; and
specifying a number of concurrent processes to be executed in said system-under-test.

36. The method according to claim 35, wherein said alphabet comprises a gap.

37. The method according to claim 20, wherein said step of generating said synchronization patterns comprises minimizing a number of said synchronization patterns.

38. A computer software product for verification of a system implementation, comprising a computer-readable medium in which computer program instructions are stored, which instructions, when read by a computer, cause the computer to execute the steps of:
generating a test program for execution on a system-under-test;
producing a behavioral model of said system-under-test;
responsive to said behavioral model, constructing a behavioral simulator;
organizing a plurality of test cases of said test program into discrete synchronization steps;
executing a finite state machine to generate a plurality of synchronization patterns, said synchronization patterns providing a predetermined independence coverage degree for said test cases;
stimulating said system-under-test according to said test program, to cause said system-under-test to concurrently execute said test cases synchronously in said synchronization steps; and
comparing a response of said system-under-test upon completion of one of said synchronization steps with a predicted result according to said behavioral model.

39. The computer software product according to claim 38, wherein said step of stimulating said system-under-test is performed by concurrently executing one of said test cases in a first cloned object and in a second cloned object.

40. The computer software product according to claim 38, wherein said step of stimulating said system-under-test comprises executing a plurality of different test cases on a plurality of cloned objects.

41. The computer software product according to claim 38, wherein said step of stimulating said system-under-test comprises executing a plurality of different test cases on a plurality of different objects.

42. The computer software product according to claim 38, wherein said step of stimulating said system-under-test comprises executing a plurality of cloned processes.

43. The computer software product according to claim 38, wherein said step of stimulating said system-under-test comprises executing said test cases on a plurality of cloned hosts.

44. The computer software product according to claim 38, wherein said step of stimulating said system-under-test comprises executing said test cases in concurrent synchronization.

45. The computer software product according to claim 38, wherein said step of stimulating said system-under-test comprises executing said test cases in sequential synchronization.

46. The computer software product according to claim 38, wherein said step of stimulating said system-under-test comprises executing a synchronization step of a first one of said test cases in a different execution interval than a corresponding synchronization step of a second one of said test cases.

47. The computer software product according to claim 38, wherein said step of stimulating said system-under-test comprises separating two of said synchronization steps by a gap.

48. The computer software product according to claim 47, wherein said gap comprises a plurality of gaps randomly distributed at different ones of said synchronization steps.

49. The computer software product according to claim 47, wherein said gap comprises a plurality of gaps that are systematically distributed among said synchronization steps.

50. The computer software product according to claim 38, wherein said step of generating said plurality of synchronization patterns is performed dynamically.

51. The computer software product according to claim 50, wherein said step of generating said plurality of synchronization patterns is performed adaptive to said response of said system-under-test.

52. The computer software product according to claim 38, wherein said step of executing a finite state machine is performed by:
    specifying an alphabet of test steps;
    defining a string of said alphabet; and
    specifying a number of concurrent processes to be executed in said system-under-test.

53. The computer software product according to claim 52, wherein said alphabet comprises a gap.

54. The computer software product according to claim 38, wherein said step of executing a finite state machine comprises minimizing a number of said synchronization patterns.

55. A method for verification of a system implementation tangibly embodied on a computer-readable medium, comprising the steps of:
    generating a test program for execution on a system-under-test, said test program comprising a plurality of processes;
    producing a behavioral model of said system-under-test;
    responsive to said behavioral model, constructing a behavioral simulator;
    generating a synchronization pattern automatically for each of said processes in a finite state machine;
    stimulating said system-under-test according to said test program, wherein synchronization steps of each of said processes execute concurrently according to said synchronization pattern;
    delaying during an execution interval until each of said processes has completed a respective one of said synchronization steps; and
    thereafter comparing a response of said system-under-test with a predicted result according to said behavioral model.

56. The method according to claim 55, wherein said step of stimulating said system-under-test comprises executing one of said synchronization steps of a first one of said processes in a different execution interval than a corresponding one of said synchronization steps of a second one of said processes.

57. The method according to claim 55, wherein said step of stimulating said system-under-test comprises separating two of said synchronization steps of one of said processes by a gap.

58. The method according to claim 57, wherein said gap comprises a plurality of gaps randomly distributed at different ones of said synchronization steps.

59. The method according to claim 57, wherein said gap comprises a plurality of gaps that are systematically distributed among said synchronization steps.

60. The method according to claim 55, wherein said step of generating said synchronization pattern further comprises providing a predetermined independence coverage degree.

61. The method according to claim 60, wherein said step of generating said synchronization pattern is performed dynamically.

62. The method according to claim 61, wherein said step of generating said synchronization pattern is performed adaptive to said response of said system-under-test.

63. The method according to claim 60, wherein said step of generating said synchronization pattern is performed by:
    specifying an alphabet of test steps;
    defining a string of said alphabet; and
    specifying a number of concurrent processes to be executed in said system-under-test.

64. The method according to claim 63, wherein said alphabet comprises a gap.

65. The method according to claim 63, wherein said step of generating said synchronization pattern comprises minimizing a number of repetitions of said string of said alphabet.

66. A computer software product, comprising a computer-readable medium in which computer program instructions are stored, which instructions, when read by a computer, cause the computer to perform a method for verification of a system implementation, comprising the steps of:
    generating a test program for execution on a system-under-test, said test program comprising a plurality of processes;
    producing a behavioral model of said system-under-test;
    responsive to said behavioral model, constructing a behavioral simulator;
    generating a synchronization pattern for each of said processes by executing a finite state machine;
    stimulating said system-under-test according to said test program, wherein synchronization steps each of said processes execute concurrently according to said synchronization pattern;
    delaying during an execution interval until each of said processes has completed a respective one of said synchronization steps; and
    thereafter comparing a response of said system-under-test with a predicted result according to said behavioral model.

67. The computer software product according to claim 66, wherein said step of stimulating said system-under-test comprises executing one of said synchronization steps of a first one of said processes in a different execution interval than a corresponding one of said synchronization steps of a second one of said processes.

68. The computer software product according to claim 66, wherein said step of stimulating said system-under-test comprises separating two of said synchronization steps of one of said processes by a gap.

69. The computer software product according to claim 68, wherein said gap comprises a plurality of gaps randomly distributed at different ones of said synchronization steps.

70. The computer software product according to claim 68, wherein said gap comprises a plurality of gaps that are systematically distributed among said synchronization steps.

71. The computer software product according to claim 66, wherein said step of generating said synchronization pattern further comprises providing a predetermined independence coverage degree.

72. The computer software product according to claim 71, wherein said step of generating said synchronization pattern is performed dynamically.

73. The computer software product according to claim 72, wherein said step of generating said synchronization pattern is performed adaptive to said response of said system-under-test.

74. The computer software product according to claim 71, wherein said step of generating said synchronization pattern is performed by:

specifying an alphabet of test steps;

defining a string of said alphabet; and specifying a number of concurrent processes to be executed in said system-under-test.

75. The computer software product according to claim 74, wherein said alphabet comprises a gap.

76. The computer software product according to claim 74, wherein said step of generating said synchronization pattern comprises minimizing a number of repetitions of said string of said alphabet.

77. An apparatus for verification of a system implementation tangibly embodied on a computer-readable medium, comprising:

a test program generator for generating a test program for execution on a system-under-test, said test program comprising a plurality of processes, wherein said test program generator accesses a behavioral model of said system-under-test and responsive to said behavioral model said test program generator constructs a behavioral simulator of said system-under-test;

an automatic pattern generator x tangibly embodied on a computer-readable medium for automatically generating a synchronization pattern for each of said processes;

an execution engine for stimulating said system-under-test according to said test program, wherein synchronization steps of each of said processes execute concurrently according to said synchronization pattern;

wherein said execution engine delays a termination of an execution interval until each of said processes has completed a respective one of said synchronization steps; and a validation engine for comparing a response of said system-under-test with a predicted result according to said behavioral model.

78. The apparatus according to claim 77, wherein said execution engine stimulates said system-under-test by causing execution of one of said synchronization steps of a first one of said processes in a different execution interval than a corresponding one of said synchronization steps of a second one of said processes.

79. The apparatus according to claim 77, wherein said execution engine stimulates said system-under-test by separating two of said synchronization steps of one of said processes by a gap.

80. The apparatus according to claim 79, wherein said gap comprises a plurality of gaps randomly distributed at different ones of said synchronization steps.

81. The apparatus according to claim 79, wherein said gap comprises a plurality of gaps that are systematically distributed among said synchronization steps.

82. The apparatus according to claim 77, wherein said synchronization pattern provides a predetermined independence coverage degree.

83. The apparatus according to claim 82, wherein said pattern generator accepts an input comprising:

an alphabet of test steps;

a string of said alphabet; and a number of concurrent processes to be executed in said system-under-test.

84. The apparatus according to claim 83, wherein said alphabet comprises a gap.

85. The apparatus according to claim 83, wherein said pattern generator optimizes said synchronization pattern by minimizing a number of repetitions of said string of said alphabet.

86. The apparatus according to claim 77, wherein said pattern generator pre-computes said synchronization pattern prior to operation of said execution engine.

87. The apparatus according to claim 77, wherein said pattern generator generates said synchronization pattern dynamically.

88. The apparatus according to claim 87, wherein said pattern generator is adaptive to said response of said system-under-test.

* * * * *